US012589793B1

(12) United States Patent
Pearl et al.

(10) Patent No.: US 12,589,793 B1
(45) Date of Patent: Mar. 31, 2026

(54) VEHICLE STEERING ACTUATION DEVICE

(71) Applicant: Hostile Industries, LLC, Anniston, AL (US)

(72) Inventors: Michael Anthony Pearl, Gadsden, AL (US); Michael Grant Pearl, Anniston, AL (US)

(73) Assignee: Hostile Industries, LLC, Anniston, AL (US)

( * ) Notice: Subject to any disclaimer, the term of this patent is extended or adjusted under 35 U.S.C. 154(b) by 603 days.

(21) Appl. No.: 17/980,229

(22) Filed: Nov. 3, 2022

Related U.S. Application Data

(60) Provisional application No. 63/414,565, filed on Oct. 9, 2022.

(51) Int. Cl.
B62D 5/04 (2006.01)
B62D 1/28 (2006.01)

(52) U.S. Cl.
CPC ............. B62D 5/0403 (2013.01); B62D 1/28 (2013.01)

(58) Field of Classification Search
CPC .......... B62D 5/0403; B62D 1/28; B62D 1/22; B62D 1/24; B62D 1/283
See application file for complete search history.

(56) References Cited

U.S. PATENT DOCUMENTS

| | | | | |
|---|---|---|---|---|
| 3,003,363 A | * | 10/1961 | De Hart | G05G 7/10 |
| | | | | 74/494 |
| 7,574,940 B2 | | 8/2009 | Ridgway et al. | |

| | | | |
|---|---|---|---|
| 8,205,897 B2 | | 6/2012 | Avigni |
| 8,967,320 B2 | * | 3/2015 | Markfort ............... B62D 5/008 |
| | | | 180/443 |
| 9,857,478 B2 | | 1/2018 | Joughin |
| 10,104,827 B2 | | 10/2018 | Adamchuk et al. |
| 10,272,940 B2 | | 4/2019 | Staehle |
| 10,384,709 B2 | | 8/2019 | Joughin |
| 10,427,713 B2 | | 10/2019 | Kim et al. |

(Continued)

FOREIGN PATENT DOCUMENTS

| | | |
|---|---|---|
| CN | 111867921 A | 10/2020 |
| CN | 113454355 A | 9/2021 |

(Continued)

*Primary Examiner* — Jason D Shanske
*Assistant Examiner* — Scott Lawrence Strickler
(74) *Attorney, Agent, or Firm* — The Law Office of Patrick F. O'Reilly III, LLC

(57) ABSTRACT

A vehicle steering actuation device includes a power transfer coupling device configured to be coupled to a steering shaft within a steering column of a vehicle, the power transfer coupling device configured to be used in place of a vehicle steering wheel; an electric motor configured to rotate the power transfer coupling device to steer the vehicle, the electric motor being capable of producing sufficient torque for steering the vehicle so that a power steering assembly is not required to be operating; a control unit operatively coupled to the electric motor, the control unit configured to control the steering by controlling the electric motor based upon steering commands inputted to the control unit by a user; and an anti-rotation device configured to prevent the vehicle steering actuation device from rotating relative to an outer wall of the steering column when the steering shaft is being driven by the electric motor.

14 Claims, 9 Drawing Sheets

(56)                    References Cited

U.S. PATENT DOCUMENTS

| 10,696,213 | B2 | 6/2020 | Massonnaud et al. |
| 2004/0154854 | A1 | 8/2004 | Stephens |
| 2018/0148085 | A1* | 5/2018 | Tan ......................... B62D 1/00 |

FOREIGN PATENT DOCUMENTS

| DE | 102004021405 | A1 | 7/2005 |
| ES | 2426995 | T3 | 10/2013 |
| JP | 2007261493 | A | 10/2007 |
| JP | 6982416 | B2 | 12/2021 |
| WO | 2007009420 | A1 | 1/2007 |

* cited by examiner

VEHICLE STEERING ACTUATION DEVICE

CROSS-REFERENCE TO RELATED APPLICATIONS

This patent application claims priority to, and incorporates by reference in its entirety, U.S. Provisional Patent Application No. 63/414,565, entitled "Vehicle Steering Actuation Device", filed on Oct. 9, 2022.

STATEMENT REGARDING FEDERALLY SPONSORED RESEARCH OR DEVELOPMENT

Not Applicable.

NAMES OF THE PARTIES TO A JOINT RESEARCH AGREEMENT

Not Applicable.

INCORPORATION BY REFERENCE OF MATERIAL SUBMITTED ON A COMPACT DISK

Not Applicable.

BACKGROUND OF THE INVENTION

1. Field of the Invention

The invention generally relates to a vehicle steering actuation device. More particularly, the invention relates to vehicle steering actuation device that is used in place of a steering wheel for ease of loading, unloading, or maneuvering of a vehicle.

2. Background

The uses of manual tools, such as steering rods and ratchet style mechanisms taking the place of a vehicle's steering wheel, have previously been used while steering vehicles without the assist of power steering. Even though these devices may function, it still becomes strenuous on the moving parts of the vehicle and the operator. Also, it takes an incredible amount of force to turn a steering wheel that is not being assisted by a power steering pump, which is what occurs if a car's engine is not running. In the motorsports industry, cars are maneuvered quite often without the assistance of power steering, with the intention of saving time and money by not putting any unnecessary wear and tear on costly equipment. Loading a vehicle in a box-type transport trailer is difficult given there is minimal room. Steering the vehicle into the trailer by hand, or with the use of a tool, is strenuous and, in some instances, also dangerous.

Therefore, what is needed is a vehicle steering actuation device that is capable of steering a vehicle in place of a steering wheel of the vehicle. Moreover, a vehicle steering actuation device is needed that is capable of steering a vehicle without a person being inside the vehicle. Furthermore, there is a need for a vehicle steering actuation device that is capable of steering a vehicle without requiring a person to be walking beside or around the vehicle being guided.

BRIEF SUMMARY OF EMBODIMENTS OF THE INVENTION

Accordingly, the present invention is directed to a vehicle steering actuation device that substantially obviates one or more problems resulting from the limitations and deficiencies of the related art.

In accordance with one or more embodiments of the present invention, there is provided a vehicle steering actuation device that includes a power transfer coupling device configured to be coupled to a steering shaft within a steering column of a vehicle, the power transfer coupling device configured to be used in place of a steering wheel of the vehicle; an electric motor operatively coupled to the power transfer coupling device, the electric motor configured to rotate the power transfer coupling device in order to steer the vehicle, the electric motor being capable of producing sufficient torque for steering the vehicle so that a power steering assembly of the vehicle is not required to be operating; a control unit operatively coupled to the electric motor, the control unit configured to control the steering of the vehicle by controlling the electric motor based upon steering commands inputted to the control unit by a user; a frame assembly for supporting the power transfer coupling device, the electric motor, and the control unit; and an anti-rotation device attached to the frame assembly, the anti-rotation device configured to prevent the vehicle steering actuation device from rotating relative to an outer wall of the steering column when the steering shaft is being driven by the electric motor.

In a further embodiment of the present invention, the vehicle steering actuation device further comprises a housing attached to the frame assembly, the electric motor and control unit being disposed inside the housing.

In yet a further embodiment, the vehicle steering actuation device further comprises a control panel operatively coupled to the control unit, the control panel disposed on the housing of the vehicle steering actuation device, and the control panel comprising one or more buttons for allowing the user to input the steering commands for the control unit.

In still a further embodiment, the vehicle steering actuation device further comprises a hand controller operatively coupled to the control unit, the hand controller comprising one or more buttons for allowing the user to input the steering commands for the control unit.

In yet a further embodiment, the control unit is configured to wirelessly communicate with a portable electronic device, the portable electronic device comprising a software application loaded thereon for allowing the user to input the steering commands for the control unit.

In still a further embodiment, the portable electronic device is selected from the group consisting of: (i) a smartphone, (ii) a tablet, and (iii) a laptop computer.

In yet a further embodiment, the vehicle steering actuation device further comprises a battery electrically coupled to the electric motor and the control unit, the battery providing power for operating the electric motor and the control unit.

In still a further embodiment, the power transfer coupling device comprises a female coupling member that is configured to engage with a male coupling member at an end of the steering shaft.

In yet a further embodiment, the anti-rotation device comprises a male collar member configured to be mounted on the outer wall of the steering column and a female collar member attached to a base plate of the frame assembly, the male collar member configured to engage with the female collar member so as to prevent the vehicle steering actuation device from rotating relative to the outer wall of the steering column.

In still a further embodiment, the male collar member has a tear drop shape, and the female collar member has a tear drop-shaped aperture disposed therethrough that corresponds to the tear drop shape of the male collar member.

In yet a further embodiment, the vehicle steering actuation device further comprises a gear reduction box connected between the electric motor and the power transfer coupling device, the gear reduction box configured to reduce an output speed of the electric motor so that the power transfer coupling device is rotated at a lower speed suitable for steering the vehicle.

It is to be understood that the foregoing general description and the following detailed description of the present invention are merely exemplary and explanatory in nature. As such, the foregoing general description and the following detailed description of the invention should not be construed to limit the scope of the appended claims in any sense.

BRIEF DESCRIPTION OF THE SEVERAL VIEWS OF THE DRAWINGS

The invention will now be described, by way of example, with reference to the accompanying drawings, in which.

Throughout the figures, the same parts are always denoted using the same reference characters so that, as a general rule, they will only be described once.

DETAILED DESCRIPTION OF EMBODIMENTS OF THE INVENTION

Figure 1:
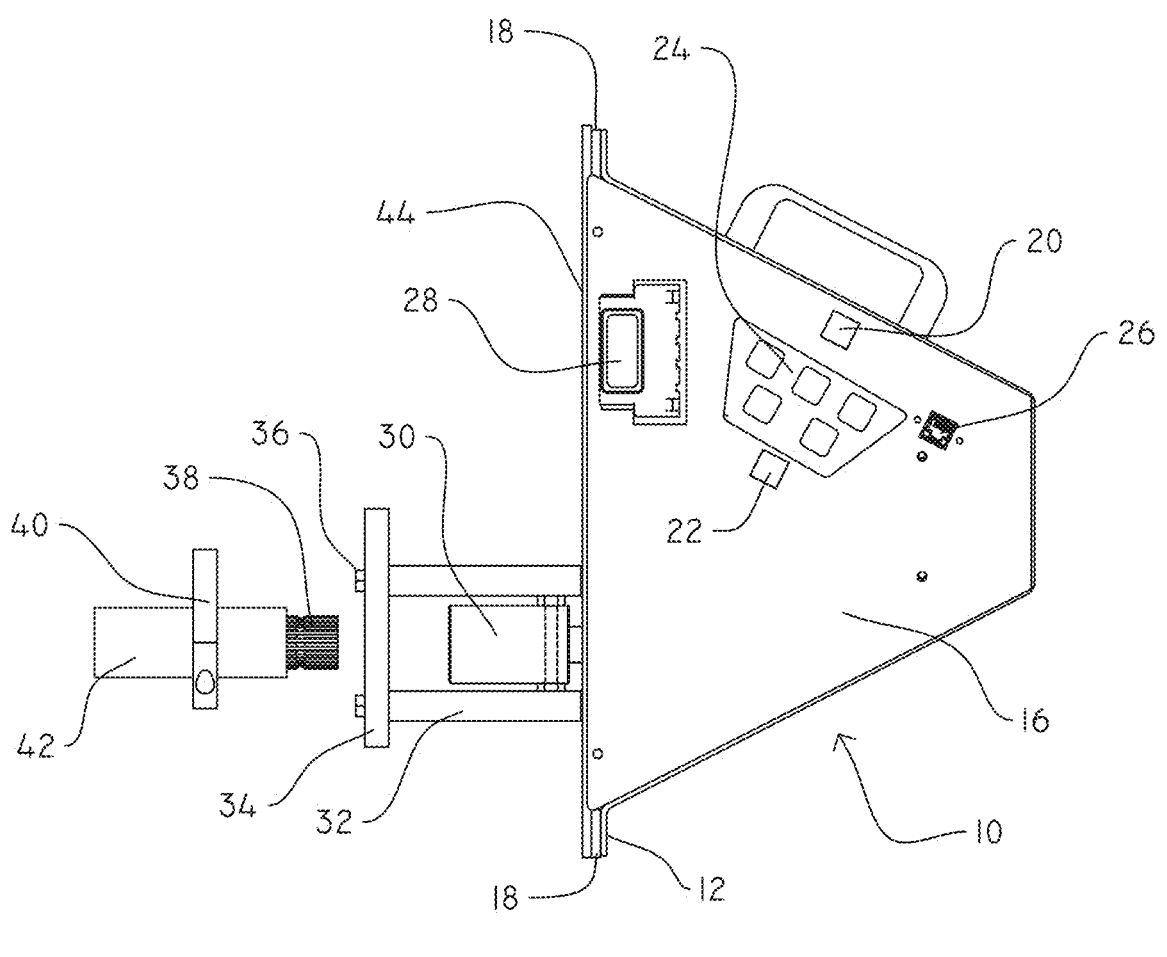
FIG. 1 is a top view of a vehicle steering actuation device, according to an embodiment of the invention.
Figure 2:
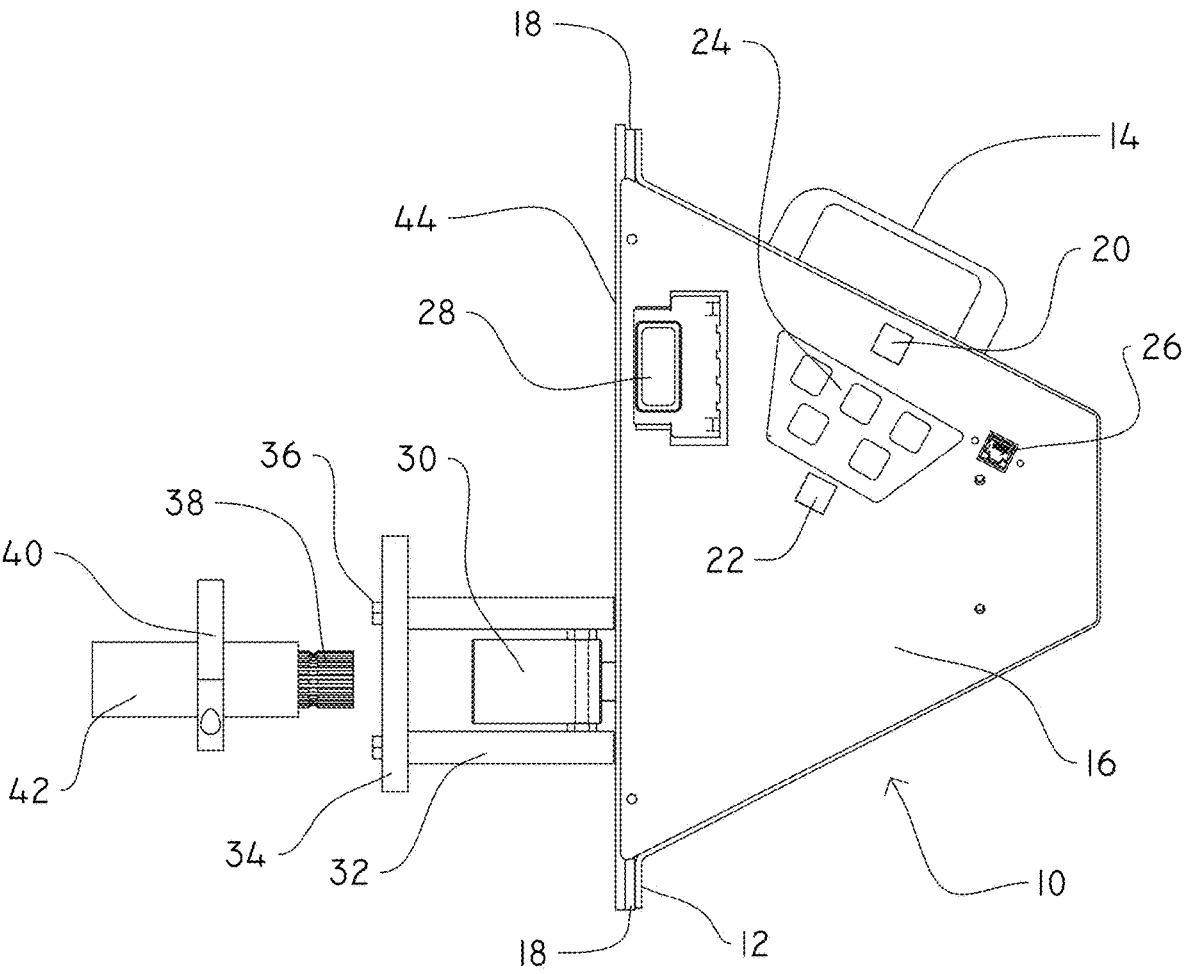
FIG. 2 is an enlarged top view of the vehicle steering actuation device of FIG. 1.

An illustrative embodiment of a vehicle steering actuation device is seen generally at 10 in FIGS. 1 and 2. With initial reference to FIGS. 1, 2, and 4, it can be seen that the vehicle steering actuation device 10 generally comprises a power transfer coupling device 30 configured to be coupled to a steering shaft within a steering column 42 of a vehicle, the power transfer coupling device 30 configured to be used in place of a steering wheel of the vehicle; an electric motor 48 operatively coupled to the power transfer coupling device 30, the electric motor 48 configured to rotate the power transfer coupling device 30 in order to steer the vehicle, the electric motor 48 being capable of producing sufficient torque for steering the vehicle so that a power steering assembly of the vehicle is not required to be operating; a control unit or control board operatively coupled to the electric motor 48, the control unit configured to control the steering of the vehicle by controlling the electric motor 48 based upon steering commands inputted to the control unit by a user; a frame assembly 12, 44 for supporting the power transfer coupling device 30, the electric motor 48, and the control unit; and an anti-rotation device 34, 40 attached to the frame assembly 12, 44, the anti-rotation device 34, 40 configured to prevent the vehicle steering actuation device 10 from rotating relative to an outer wall of the steering column 42 when the steering shaft is being driven by the electric motor 48.

In the illustrative embodiment, the vehicle steering actuation device 10 rotates a steering shaft of a vehicle utilizing its own force without relying on the power steering assembly of the vehicle. Also, the vehicle steering actuation device 10 does not engage at all with a steering wheel of a vehicle, but rather is used in place of the steering wheel after the steering wheel has been removed from the vehicle. As will be described in more detail hereinafter, the device 10 operatively attaches via splined coupling members 30, 38 on the steering column 42 made accessible by removing a quick disconnect steering wheel. A gear reduction motor 48 that rotates the steering shaft in place of an operator is used for maneuvering any vehicle while loading, unloading, or maneuvering in a controlled manner.

As shown in FIGS. 1 and 2, in the illustrative embodiment, the vehicle steering actuation device 10 further comprises a housing 16 attached to the frame assembly 12, 44, the electric motor 48 and control unit being disposed inside the housing 16. In FIGS. 1 and 2, it can be seen that the housing 16 may be provided with a handle 14 for easily carrying the device 10 when it is detached from the steering column 42 of the vehicle.

In the illustrative embodiment, referring again to FIGS. 1, 2, and 4, it can be seen that the vehicle steering actuation device 10 further comprises a battery 28 electrically coupled to the electric motor 48 and the control unit. The battery 28 provides power for operating the electric motor 48 and the control unit. As shown in FIGS. 1 and 2, the housing 16 of the device 10 may be provided with a battery holder for detachably receiving the battery 28 therein.

Now, the functionality of the control unit or control board will be described in more detail. In the illustrative embodiment, an electrical command using power from the battery 28 is sent to the control unit. In the illustrative embodiment, the control unit provides the following functionality: (i) the control unit sends power to the positive terminal of the electric motor 48 for 0.10 seconds of power burst for commanding the motor 48 to turn clockwise; (ii) the control unit sends power to the negative terminal of the electric motor 48 for 0.10 seconds of power burst for commanding motor to turn counterclockwise; (iii) the control unit sends power to the positive terminal of the electric motor 48 for constant power commanding motor 48 to turn clockwise until desired direction is obtained or a circuit breaker is triggered; and (iv) the control unit sends power to the negative terminal of the electric motor 48 for constant power commanding motor 48 to turn counterclockwise until the desired direction is obtained or the circuit breaker is triggered. In the illustrative embodiment, the vehicle steering actuation device 10 is provided with a 20 amp (20A) circuit breaker for overcurrent protection.

Figure 4:
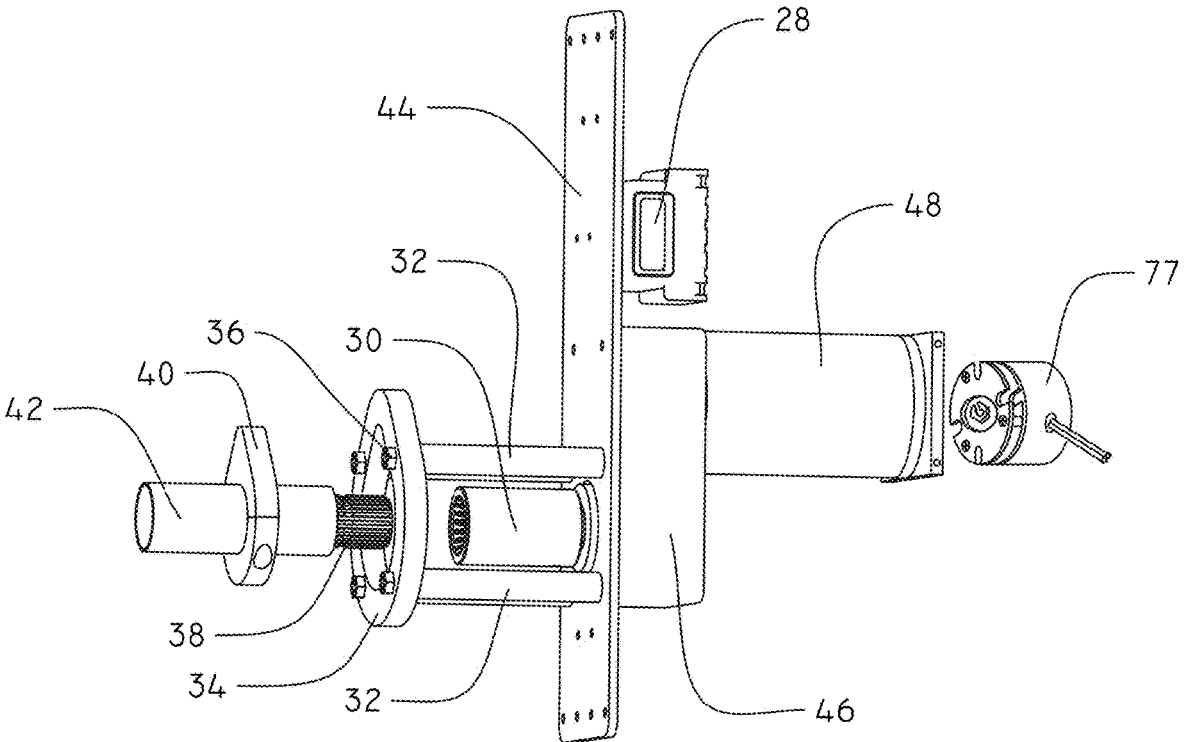
FIG. 4 is a perspective view of selected components of the vehicle steering actuation device of FIG. 1, wherein a housing cover of the vehicle steering actuation device has been removed.
Figure 6:
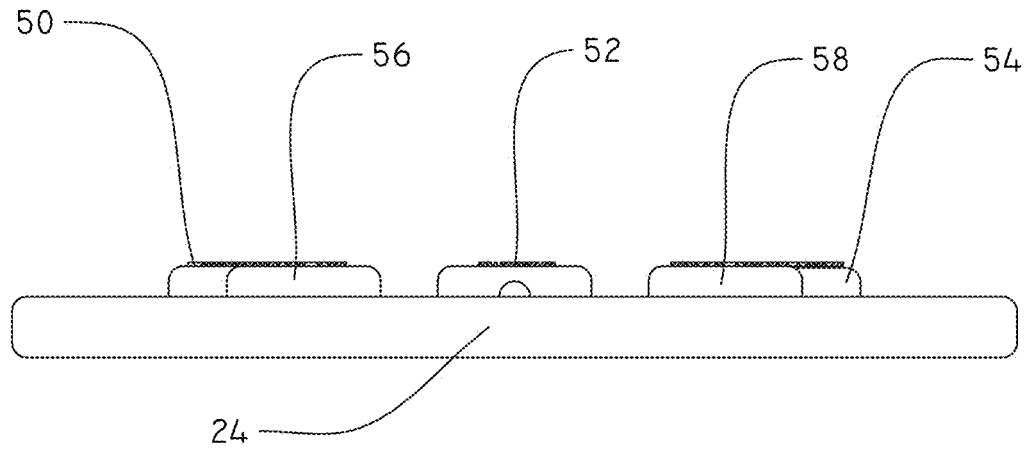
FIG. 6 is a side elevational view of a control panel of the vehicle steering actuation device of FIG. 1.

With combined reference to FIGS. 1, 2, 4, and 5, in the illustrative embodiment, the power transfer coupling device 30 comprises a female coupling member that is configured to engage with a male coupling member 38 at an end of the steering shaft. In the illustrative embodiment, as shown in FIG. 4, the power transfer coupling device 30 of the vehicle steering actuation device 10 is in a form of a female splined coupler that slides over the male splined coupler 38 that is located on the steering shaft in steering column 42 (see FIG. 4). For example, in the illustrative embodiment, the female coupling member 30 may comprise a Dec. 18, 2018 internally splined bushing for engaging with the male splined coupler 38 on the steering shaft.

Figure 3:
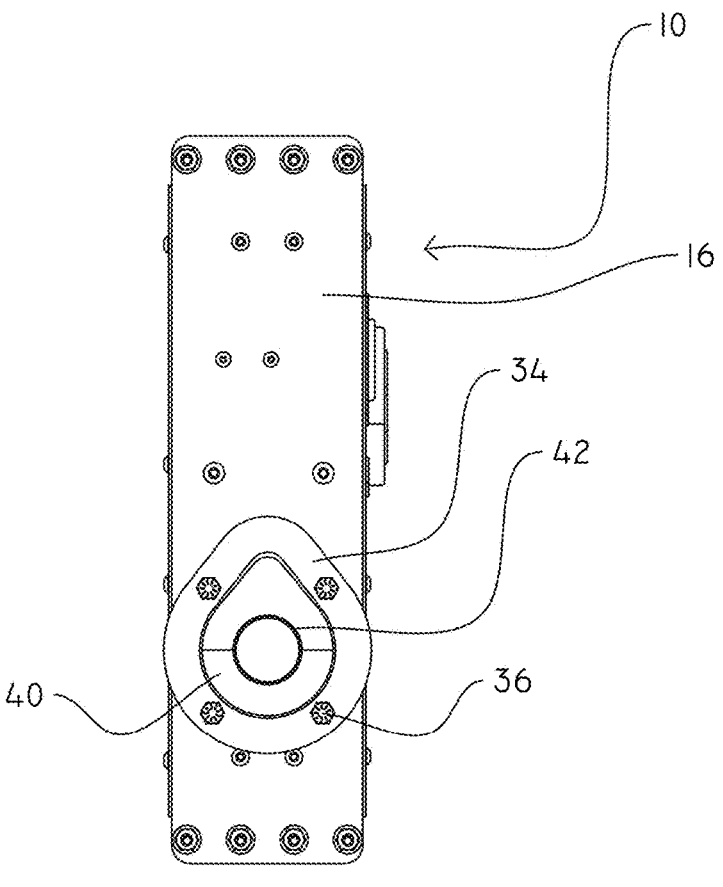
FIG. 3 is a rear elevational view of the vehicle steering actuation device of FIG. 1.
Figure 5:
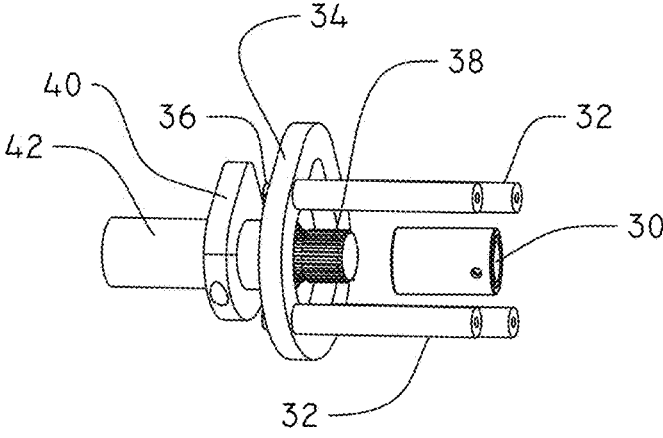
FIG. 5 is a perspective view of a power transfer coupling device and an anti-rotation device of the vehicle steering actuation device of FIG. 1.

In the illustrative embodiment, as shown in FIGS. 1-5, the anti-rotation device 34, 40 comprises a male collar member 40 configured to be mounted on the outer wall of the steering column 42 and a female collar member 34 attached to a base plate 44 of the frame assembly 12, 44. In the illustrative embodiment, with combined reference to FIGS. 1 and 2, it can be seen that the female collar member 34 is attached to the base plate 44 by a plurality of standoff members 32 that are secured to the female collar member 34 by assembly bolts 36. The male collar member 40 is configured to engage with the female collar member 34 so as to prevent the vehicle steering actuation device 10 from rotating relative to the outer wall of the steering column 42. As shown in FIGS. 3-5, the male collar member 40 has a tear drop shape, and the female collar member 34 has a tear drop-shaped aperture disposed therethrough that corresponds to the tear drop shape of the male collar member 40. Also, as shown in FIGS. 1 and 2, it can be seen that a spacer member 18 may be provided between the base plate 44 and the side portion of the frame assembly 12. In the illustrative embodiment, the male collar member 40 has a central circular aperture that is configured to attach to a steering column 42 with an approximately 1½ inch outside diameter.

With reference to FIG. 4, in the illustrative embodiment, the vehicle steering actuation device further comprises a gear reduction box 46 (i.e., gear reduction transmission) connected between the electric motor 48 and the power transfer coupling device 30. The gear reduction box 46 is configured to reduce an output speed of the electric motor 48 so that the power transfer coupling device 30 is rotated at a lower speed suitable for steering the vehicle.

In the illustrative embodiment, the vehicle steering actuation device 10 may further comprise a direct current (DC) electric clutch/brake solenoid 77 (see FIG. 4) for stopping the main shaft (armature) of DC electric motor 48 from rotating when an outside torque is applied to the opposite end that the motor 48 is connected to. In this case, it is the gear reduction transmission 46 that is attached to the female collar 30. In the illustrative embodiment, when there is no power, the electric clutch/brake solenoid 77 locks the motor armature in place through a hex shaft that is secured to the opposite end of the armature output shaft. The hex shaft is through a reciprocating hex opening in a clutch type disc that is sandwiched between two plates. Power is applied to the DC electric clutch/brake solenoid 77 every time electrical commands are given which activates the magnetic force to release pressure from the disc allowing the hex shaft and hex-type disc to rotate along with the main shaft of the motor 48 (armature) and the shaft of the gear reduction transmission 46.

Figure 10:
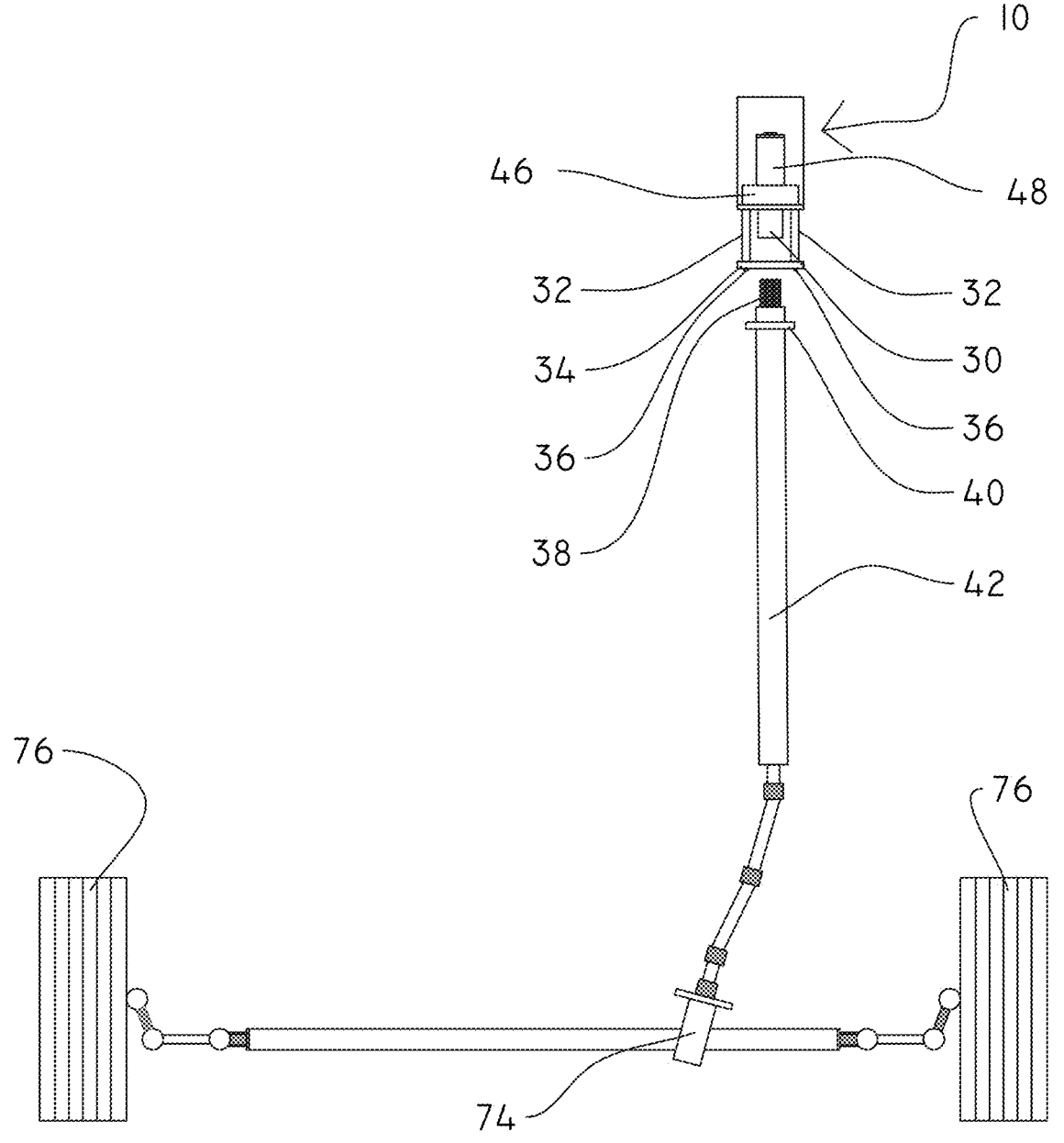
FIG. 10 is a schematic representation illustrating attachment of the vehicle steering actuation device of FIG. 1 to a steering shaft of a steering system, wherein the steering system includes a steering column with the steering shaft, and a rack-and-pinion assembly.

In the illustrative embodiment, the self-contained direct current (DC) electric motor 48 of the vehicle steering actuation device 10 is rotatably coupled to the gear reduction box 46. In turn, the output shaft of the gear reduction box 46 is secured to the power transfer coupling device 30 that matingly engages with the male coupling member 38 at an end of the steering shaft in the steering column 42. In the illustrative embodiment, the male coupling member 38 at the end of the steering shaft is made accessible by removing a quick disconnect steering wheel, thereby exposing the male coupling member 38 at the end of the steering column 42. Once the female power transfer collar 30 and male coupling member 38 on the steering column 42 are joined together, the output torque from the motor 48 rotates the steering shaft via the male coupling member 38 in both the clockwise and counter-clockwise directions in order to steer the wheels 76 of the vehicle in the desired direction (see FIG. 10). As shown in FIG. 10, the steering shaft in the steering column 42 is operatively coupled to a rack and pinion steering box 74. The anti-rotation force is controlled by a female collar member 34 that is attached to the base plate 44 of the device 10. The male collar member 40 is attached to the live steering column 42 which corresponds to the aperture in the female collar member 34. Once the tear drop shapes of the two collars 34, 40 intersect, the matingly engaged collars 34, 40 create an interference fit that limits the rotation of the device housing 16, thereby allowing the motive energy of the device 10 to rotate the steering shaft inside the live steering column 42.

In the illustrative embodiment, the drive train of the vehicle steering actuation device 10 may have worm-to-wheel gear reduction and inherent braking. In addition, the drive train of the vehicle steering actuation device 10 may have a 60:1 gear ratio, a ¾" output shaft, a 12V direct current (DC) input voltage, an operating torque of 44 Newton-Meters (NM), an output force of greater than 100 lbs., and a 1.5 HP electric motor 48.

Figure 7:
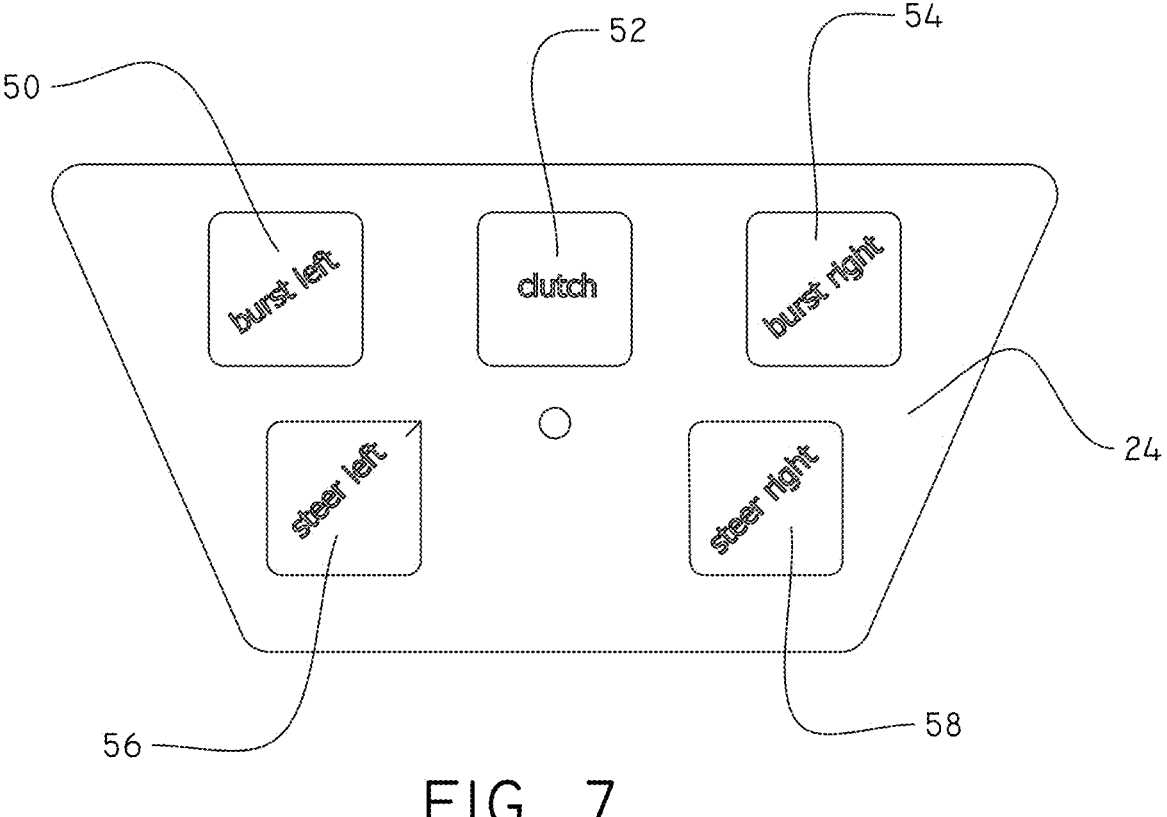
FIG. 7 is a top view of the control panel of the vehicle steering actuation device of FIG. 1.

In the illustrative embodiment, with combined reference to FIGS. 1, 2, 6, and 7, it can be seen that the vehicle steering actuation device 10 further comprises a control panel 24 operatively coupled to the control unit. The control panel 24 is disposed on the housing 16 of the vehicle steering actuation device 10, and the control panel 24 comprises a plurality of buttons 50, 52, 54, 56, 58 for allowing the user to input the steering commands for the control unit. In FIG. 7, when a user presses the "burst left" button 50, the motor 48 is activated so as to rotate the gear box output shaft left approximately 15 degrees. When a user presses the "clutch" button 52, the clutch/brake 77 (FIG. 4) is disengaged, which allows gear box output shaft to rotate when outside forces are applied. When a user presses the "burst right" button 54, the motor 48 is activated so as to rotate the gear box output shaft right approximately 15 degrees. When a user presses the "steer left" button 56, the motor 48 is activated so as to rotate the gear box output shaft to the left until the desired direction is obtained. When a user presses the "steer right" button 58, the motor 48 is activated so as to rotate the gear box output shaft to the right until the desired direction is obtained. In addition, as shown in FIGS. 1 and 2, it can be seen that the housing 16 may be provided with a first indicator light 20 (e.g., a white/blue light) that initially flashes white when the device 10 is activated (i.e., with any of the control devices described below). Once the device 10 starts communicating via a personal area network (e.g., Bluetooth® with a portable electronic device, the first indicator light 20 of the device 10 will alternate flashing blue and white every one second. Also, as shown in FIGS. 1 and 2, it can be seen that the housing 16 further may be provided with a second indicator light 22 (e.g., a red light) that continuously illuminates red when the personal area network (e.g., Bluetooth®) is connected (i.e., serving as a second confirmation of the personal area network connection.

Figure 8:
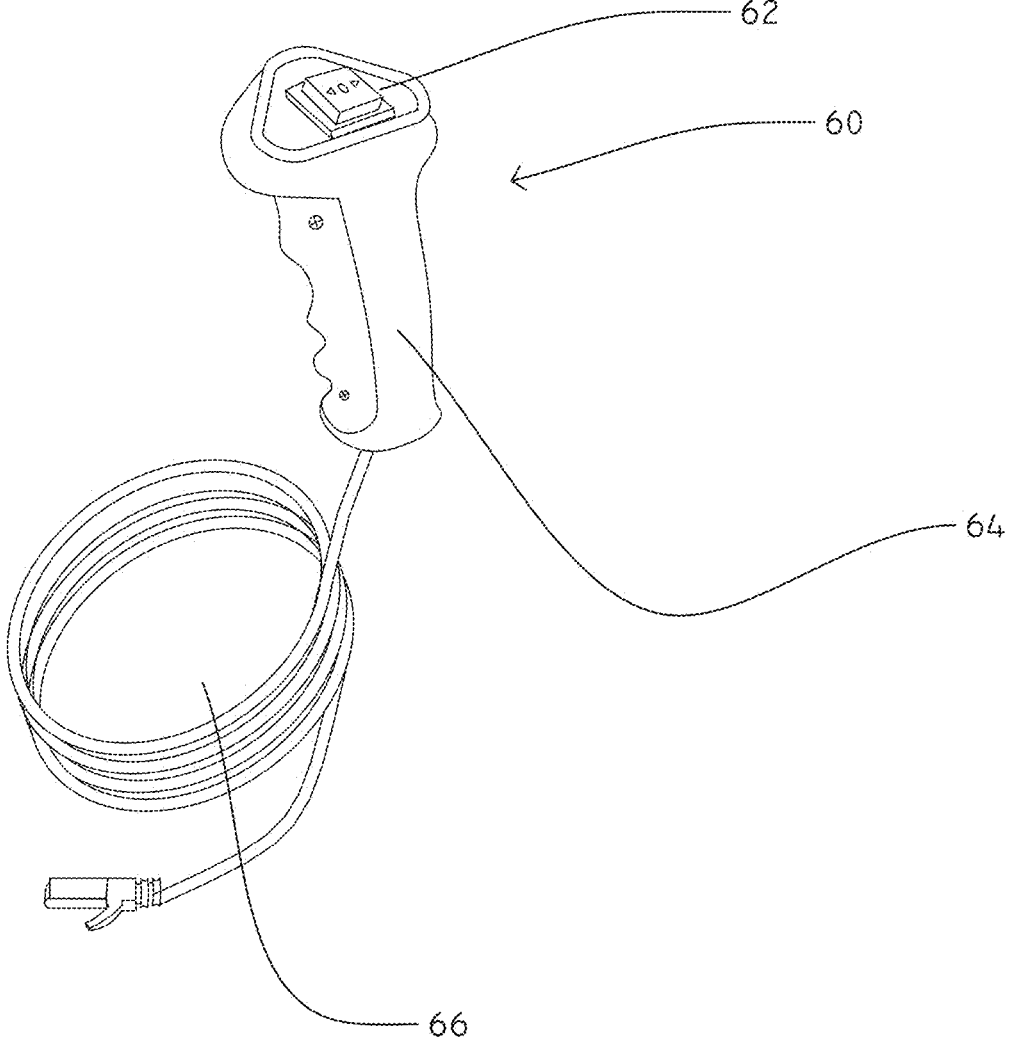
FIG. 8 is a perspective view of a hand controller of the vehicle steering actuation device of FIG. 1.

In the illustrative embodiment, with reference to FIG. 8, it can be seen that the vehicle steering actuation device 10 may further comprise a hand controller 60 operatively coupled to the control unit. The hand controller 60 comprises a rocker switch 62 (or rocker button) for allowing the user to input the steering commands for the control unit. As shown in FIG. 8, the hand controller 60 of the illustrative embodiment further comprises an Ethernet cable 66 for electrically coupling the hand controller 60 to the control unit of the vehicle steering actuation device 10. In the illustrative embodiment, the Ethernet cable 66 is configured to connect to the Ethernet port 26 (e.g., RJ45 port) on the housing 16 of the vehicle steering actuation device 10 (see FIGS. 1 and 2). As shown in FIG. 8, the hand controller 60 further comprises a grip portion 64 for accommodating a hand of the user.

Figure 9:
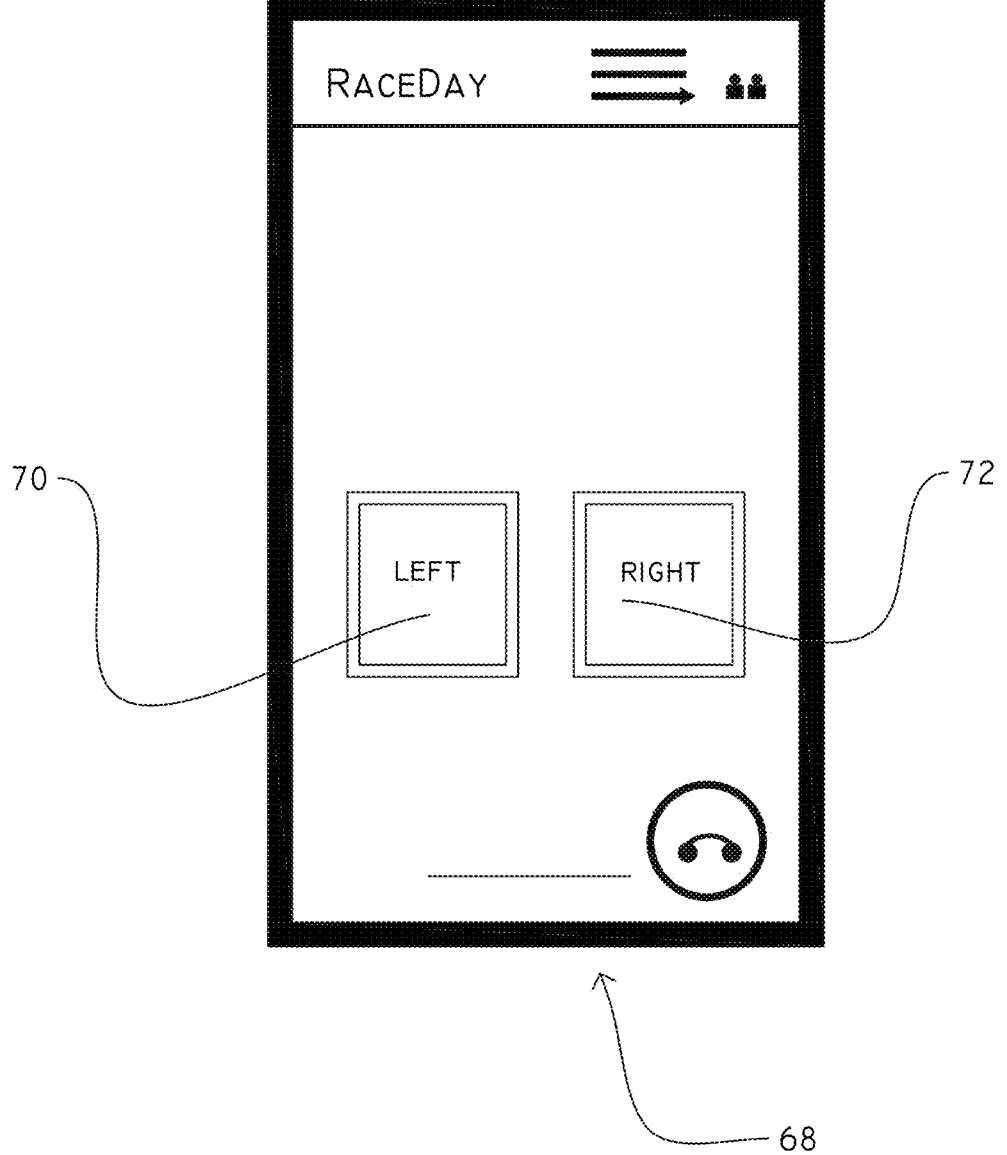
FIG. 9 is a front view of a smartphone with a steering control software application for controlling the vehicle steering actuation device of FIG. 1.

In the illustrative embodiment, the control unit of the vehicle steering actuation device 10 also may be configured to wirelessly communicate with a portable electronic device (e.g., a smartphone 68—see FIG. 9) via a personal area network (e.g., Bluetooth®). As shown in the illustrative embodiment of FIG. 9, the portable electronic device (e.g., a smartphone 68) may comprise a steering control software application ("app") loaded thereon for allowing the user to input the steering commands for the control unit of the vehicle steering actuation device 10. For example, as shown in FIG. 9, the steering control software application on the portable electronic device 68 may comprise "Left" and "Right" virtual touchscreen buttons 70, 72 for steering the vehicle either left or right using the vehicle steering actuation device 10. In addition to a smartphone 68, other portable electronic devices may be used to control the operation of the vehicle steering actuation device 10, such as tablets and a laptop computer.

As such, in the illustrative embodiment, the vehicle steering actuation device 10 is a self-contained device that can be activated in three ways by using: (i) the control panel 24 with the snap switches or buttons 50, 52, 54, 56, 58 shown in FIGS. 6 and 7, (ii) the hand controller 60 shown in FIG. 8, or (iii) the phone app shown in FIG. 9. In the illustrative embodiment, the vehicle steering actuation device 10 functionality operates based on commands from these three types of controllers 24, 60, 68.

Figure 11:
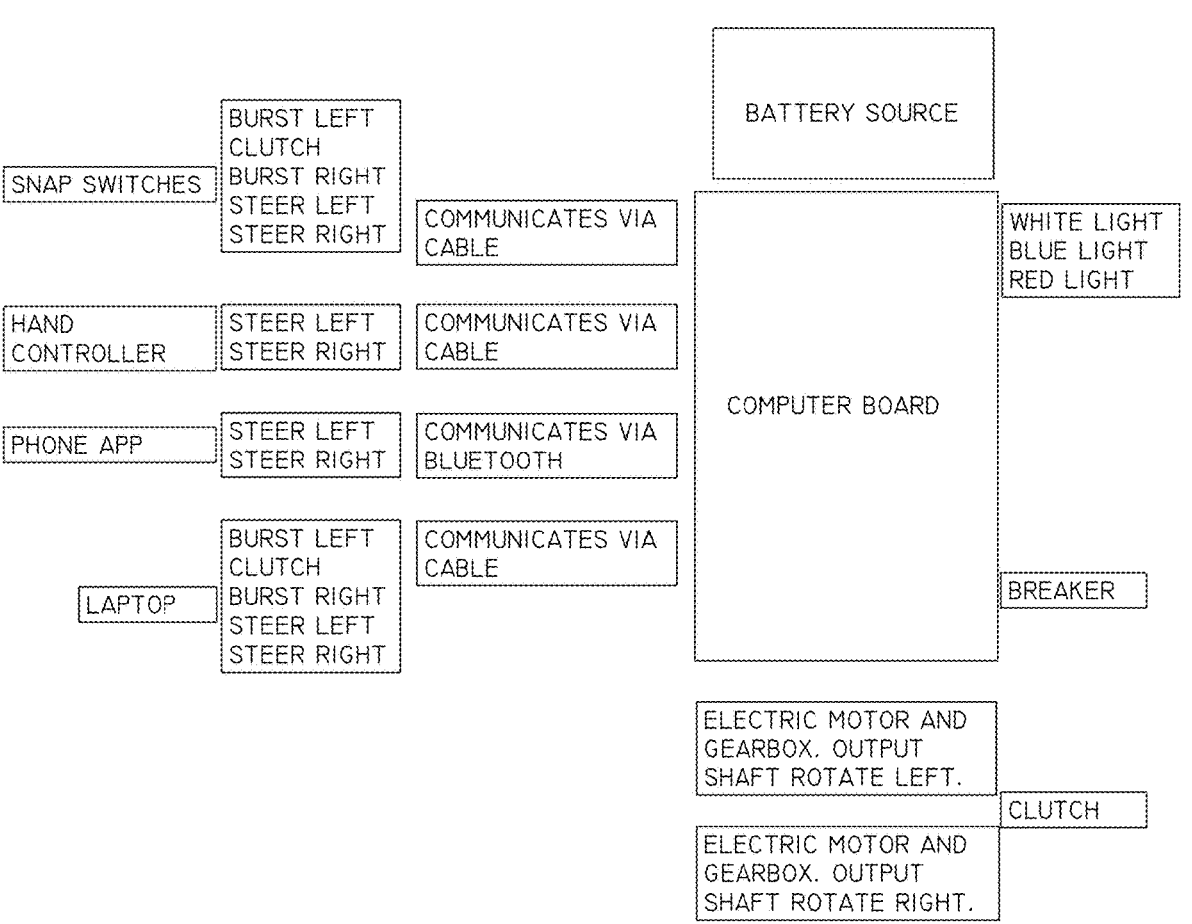
FIG. 11 is a block diagram of the control components that may be utilized in the illustrative embodiments of the vehicle steering actuation device described herein.

Now, turning to the block diagram of FIG. 11, the control components that may be utilized in the illustrative embodiments of the vehicle steering actuation device 10 will be described. As shown in the FIG. 11, the plurality of snap switches or buttons 50, 52, 54, 56, 58 on the control panel 24 of the illustrative vehicle steering actuation device 10 are operatively coupled to the computer board (i.e., the control unit) by means of a cable inside the housing 16 of the device 10. The computer board (control unit) inside the housing 16 of the device 10 is powered by the battery source 28. The computer board (control unit) is operatively coupled to the electric motor 48 and the gear box 46, which rotates the output shaft of the vehicle steering actuation device 10 left or right. When engaged, the direct current (DC) electric clutch/brake solenoid 77 prevents the main shaft (armature) of DC electric motor 48 from rotating when an outside torque is applied to the device 10. As shown in FIG. 11, the computer board (control unit) is further operatively coupled to the indicator lights 20, 22 and the circuit breaker providing overcurrent protection. Turning again to FIG. 11, it can be seen that the hand controller 60 (see FIG. 8) of the illustrative embodiment is operatively coupled to the computer board (i.e., the control unit) by means of the external cable 66 connected to the Ethernet port 26 (e.g., RJ45 port) on the housing 16 of the vehicle steering actuation device 10. In the illustrative embodiment, the smartphone 68 with the steering control software application ("app") loaded thereon (FIG. 9) is operatively coupled to the computer board (i.e., the control unit) of the device 10 by means of a wireless personal area network (e.g., Bluetooth®). In one alternative embodiment, a laptop computer or tablet may be operatively coupled to the computer board (i.e., the control unit) by means of an external cable connected to the Ethernet port 26 (e.g., RJ45 port) on the housing 16 of the vehicle steering actuation device 10.

Now, the manner in which the vehicle steering actuation device 10 is used will be described. The vehicle steering actuation device 10 is an important tool when loading a vehicle in a trailer by its unique ability to turn the steering wheel electronically. The vehicle steering actuation device 10 also greatly enhances user safety. With the use of this device 10, there is no reason for a person to be walking beside or around the vehicle during loading, which could result in the person getting caught between the vehicle and the trailer wall, or getting a body limb run over by the vehicle. In another example, the device 10 can maneuver a vehicle to and from a destination without the strains of turning the steering wheel manually in the absence of power steering. To properly set the front-end settings of a vehicle, one must turn the steering wheel in a sweeping motion from right to left. With the use of the device 10 described herein, setting the front-end settings such as the caster and camber will become much easier.

In the illustrative embodiment, the vehicle steering actuation device 10 may have the following exemplary dimensions: (i) an overall housing width of approximately 15 inches, (ii) an overall housing length of approximately 9.25 inches from the front of the housing 16 to the base plate 44, (iii) a length of approximately 12.5 inches from the front of the housing 16 to rear edge of the power transfer coupling device 30, and (iv) a length of approximately 13.75 inches from the front of the housing 16 to rear surface of the female collar member 34. Also, in the illustrative embodiment, the vehicle steering actuation device 10 may have an overall weight of approximately 17 pounds (17 lbs.) with the battery 28.

It is readily apparent that the aforedescribed vehicle steering actuation device 10 offers numerous advantages. First, the vehicle steering actuation device 10 is capable of steering a vehicle in place of a steering wheel of the vehicle. Secondly, the vehicle steering actuation device 10 is capable of steering a vehicle without a person being inside the vehicle. Finally, the vehicle steering actuation device 10 is capable of steering a vehicle without requiring a person to be walking beside or around the vehicle being guided.

Any of the features or attributes of the above described embodiments and variations can be used in combination with any of the other features and attributes of the above described embodiments and variations as desired.

Although the invention has been shown and described with respect to a certain embodiment or embodiments, it is apparent that this invention can be embodied in many different forms and that many other modifications and variations are possible without departing from the spirit and scope of this invention.

Moreover, while exemplary embodiments have been described herein, one of ordinary skill in the art will readily appreciate that the exemplary embodiments set forth above are merely illustrative in nature and should not be construed as to limit the claims in any manner. Rather, the scope of the invention is defined only by the appended claims and their equivalents, and not, by the preceding description.

The invention claimed is:

1. A vehicle steering actuation device, comprising:
a power transfer coupling device configured to be coupled to a steering shaft within a steering column of a vehicle, the power transfer coupling device configured to be used in place of a steering wheel of the vehicle;
an electric motor operatively coupled to the power transfer coupling device, the electric motor configured to rotate the power transfer coupling device in order to steer the vehicle, the electric motor being capable of producing sufficient torque for steering the vehicle so that a power steering assembly of the vehicle is not required to be operating;
a control unit operatively coupled to the electric motor, the control unit configured to control the steering of the vehicle by controlling the electric motor based upon steering commands inputted to the control unit by a user;
a frame assembly for supporting the power transfer coupling device, the electric motor, and the control unit, the frame assembly comprising a base plate having a first side and a second side, the first side of the base plate being oppositely disposed relative to the second side of the base plate, the first side of the base plate configured to face the power transfer coupling device and the steering column of the vehicle, and the second side of the base plate configured to face the electric motor; and
an anti-rotation device attached to the frame assembly, the anti-rotation device configured to prevent the vehicle steering actuation device from rotating relative to an outer wall of the steering column when the steering shaft is being driven by the electric motor.

2. The vehicle steering actuation device according to claim 1, further comprising a housing attached to the frame assembly, the electric motor and control unit being disposed inside the housing.

3. The vehicle steering actuation device according to claim 2, further comprising a control panel operatively coupled to the control unit, the control panel disposed on the housing of the vehicle steering actuation device, and the control panel comprising one or more buttons for allowing the user to input the steering commands for the control unit.

4. The vehicle steering actuation device according to claim 1, further comprising a hand controller operatively coupled to the control unit, the hand controller comprising one or more buttons for allowing the user to input the steering commands for the control unit.

5. The vehicle steering actuation device according to claim 1, wherein the control unit is configured to wirelessly communicate with a portable electronic device, the portable electronic device comprising a software application loaded thereon for allowing the user to input the steering commands for the control unit.

6. The vehicle steering actuation device according to claim 5, wherein the portable electronic device is selected from the group consisting of: (i) a smartphone, (ii) a tablet, and (iii) a laptop computer.

7. The vehicle steering actuation device according to claim 1, further comprising a battery electrically coupled to the electric motor and the control unit, the battery providing power for operating the electric motor and the control unit.

8. The vehicle steering actuation device according to claim 1, wherein the power transfer coupling device comprises a female coupling member that is configured to engage with a male coupling member at an end of the steering shaft.

9. A vehicle steering actuation device, comprising:
a power transfer coupling device configured to be coupled to a steering shaft within a steering column of a vehicle, the power transfer coupling device configured to be used in place of a steering wheel of the vehicle;
an electric motor operatively coupled to the power transfer coupling device, the electric motor configured to rotate the power transfer coupling device in order to steer the vehicle, the electric motor being capable of producing sufficient torque for steering the vehicle so that a power steering assembly of the vehicle is not required to be operating;
a control unit operatively coupled to the electric motor, the control unit configured to control the steering of the vehicle by controlling the electric motor based upon steering commands inputted to the control unit by a user;
a frame assembly for supporting the power transfer coupling device, the electric motor, and the control unit; and
an anti-rotation device attached to the frame assembly, the anti-rotation device configured to prevent the vehicle steering actuation device from rotating relative to an outer wall of the steering column when the steering shaft is being driven by the electric motor;
wherein the anti-rotation device comprises a male collar member configured to be mounted on the outer wall of the steering column and a female collar member attached to a base plate of the frame assembly, the male collar member configured to engage with the female collar member so as to prevent the vehicle steering actuation device from rotating relative to the outer wall of the steering column.

10. The vehicle steering actuation device according to claim 9, wherein the male collar member has a tear drop shape, and the female collar member has a tear drop-shaped aperture disposed therethrough that corresponds to the tear drop shape of the male collar member.

11. The vehicle steering actuation device according to claim 1, further comprising a gear reduction box connected between the electric motor and the power transfer coupling device, the gear reduction box configured to reduce an output speed of the electric motor so that the power transfer coupling device is rotated at a lower speed suitable for steering the vehicle.

12. A vehicle steering actuation system, comprising:
a steering shaft disposed within a steering column of a vehicle, an end of the steering shaft protruding from the steering column, the end of the steering shaft not being connected to a steering wheel of the vehicle;
a power transfer coupling device operatively coupled to the end of the steering shaft, the power transfer coupling device being coupled to the end of the steering shaft in place of the steering wheel of the vehicle;
an electric motor operatively coupled to the power transfer coupling device, the electric motor configured to rotate the power transfer coupling device in order to steer the vehicle, the electric motor being capable of producing sufficient torque for steering the vehicle so that a power steering assembly of the vehicle is not required to be operating;

a control unit operatively coupled to the electric motor, the control unit configured to control the steering of the vehicle by controlling the electric motor based upon steering 13 commands inputted to the control unit by a user;

a frame assembly for supporting the power transfer coupling device, the electric motor, and the control unit; and an anti-rotation device attached to the frame assembly, the anti-rotation device configured to prevent the vehicle steering actuation device from rotating relative to an outer wall of the steering column when the steering shaft is being driven by the electric motor.

13. The vehicle steering actuation system according to claim 12, wherein the power transfer coupling device comprises a female coupling member that engages with a male coupling member at the end of the steering shaft.

14. The vehicle steering actuation system according to claim 13, wherein the female coupling member has a first end and a second end, the first end of the female coupling member being oppositely disposed relative to the second end of the female coupling member, the first end of the female coupling member being coupled to the male coupling member at the end of the steering shaft, and the second end of the female coupling member being coupled to an output shaft of a gear reduction box that is operatively coupled to the electric motor.

* * * * *